(12) United States Patent
Watou et al.

(10) Patent No.: US 9,156,338 B2
(45) Date of Patent: Oct. 13, 2015

(54) MOLDING FOR VEHICLE AND METHOD FOR MANUFACTURING SAME

(71) Applicant: TOKAI KOGYO CO., LTD., Obu-shi, Aichi (JP)

(72) Inventors: Yasuhiro Watou, Obu (JP); Yoshihiro Nakanishi, Obu (JP)

(73) Assignee: TOKAI KOGYO CO., LTD., Obu-shi (JP)

( * ) Notice: Subject to any disclaimer, the term of this patent is extended or adjusted under 35 U.S.C. 154(b) by 0 days.

(21) Appl. No.: 14/476,305

(22) Filed: Sep. 3, 2014

(65) Prior Publication Data

US 2015/0061313 A1    Mar. 5, 2015

(30) Foreign Application Priority Data

Sep. 4, 2013   (JP) ................. 2013-182835

(51) Int. Cl.
```
B60J 10/02      (2006.01)
B29C 45/00      (2006.01)
B29D 99/00      (2010.01)
B60J 10/00      (2006.01)
B29L 31/30      (2006.01)
B29K 101/00     (2006.01)
```

(52) U.S. Cl.
CPC ............ B60J 10/02 (2013.01); B29C 45/0003 (2013.01); B29D 99/0053 (2013.01); B60J 10/0005 (2013.01); B60J 10/0054 (2013.01); B29K 2101/00 (2013.01); B29L 2031/3041 (2013.01)

(58) Field of Classification Search
CPC ............................. B60J 10/02; B60J 10/0005
USPC ........... 296/93, 84.1, 1.08; 52/204.53, 204.54
See application file for complete search history.

(56) References Cited

U.S. PATENT DOCUMENTS

| | | | | |
|---|---|---|---|---|
| 5,193,876 A | * | 3/1993 | Yada et al. | 296/93 |
| 6,106,047 A | * | 8/2000 | Nagahashi et al. | 296/93 |
| 2002/0046516 A1 | * | 4/2002 | Kato et al. | 52/204.53 |
| 2003/0090122 A1 | * | 5/2003 | Meizlish | 296/93 |
| 2005/0104406 A1 | * | 5/2005 | Pennerath | 296/93 |
| 2006/0125275 A1 | * | 6/2006 | Wato et al. | 296/93 |

FOREIGN PATENT DOCUMENTS

| | | |
|---|---|---|
| JP | A-03-128721 | 5/1991 |
| JP | A-2003-165137 | 6/2003 |

* cited by examiner

*Primary Examiner* — Jason S Morrow
(74) *Attorney, Agent, or Firm* — Oliff PLC

(57) ABSTRACT

An elongated molding for a vehicle, including: a main body including, a head portion arranged at a front surface side of a circumferential edge of a window pane, a leg portion protruding from a back surface of the head portion and being arranged to face an end surface of the circumferential edge of the window pane, and a foot portion protruding from a tip of the leg portion toward a center of the window pane, wherein a volume raising portion is integrally provided to at least a portion of a back surface of the head portion in a longitudinal direction thereof, wherein a thickness of the volume raising portion varies at at least some positions in the longitudinal direction, and wherein the volume raising portion is made of a resin material softer than a resin material constituting the head portion.

5 Claims, 11 Drawing Sheets

MOLDING FOR VEHICLE AND METHOD FOR MANUFACTURING SAME

CROSS-REFERENCE TO RELATED APPLICATIONS

This application claims priority from Japanese Patent Application No. 2013-182835 filed on Sep. 4, 2013, the entire contents of which are incorporated herein by reference.

TECHNICAL FIELD

Aspects of the present invention relate to an elongated window molding (hereinafter, simply referred to as a "molding") to be attached to, for example, a circumferential edge of a front window glass for a vehicle. Vehicles to which the window molding is applied include automobiles, buses, trucks, and the like.

BACKGROUND

Various types of window moldings made of metal, resin, etc., are known. As a window molding made of resin, which is molded by extrusion molding or injection molding, a type that is attached to a circumferential edge of a window pane by pinching the circumferential edge of the window pane from three directions of a front surface, a back surface, and an end surface of a window glass (window pane) so as to surround a circumference edge of the window pane is known. Further, in elongated moldings, there is known an isomorphic type (same cross-sectional type) in which the cross-sectional shape in a longitudinal direction is constant. However, a number of types (variant cross-sectional types) of which the cross-sectional shape in the longitudinal direction varies are also known.

Among the variant cross-sectional type resinous moldings, for example, there is a molding designed such that a height difference (h) between a front surface of a decorative portion of the molding attached to a side portion (a left side or a right side of a vehicle) of a window glass and a front surface of the window glass (window pane) becomes gradually larger in the downward direction of the window glass, from viewpoints of functionality and designability. Such moldings include moldings shown in JP-A-H03-128721 and JP-A-2003-165137. The molding of JP-A-H03-128721 is formed through extrusion molding, and is intended to be attached to an upper portion and side portions (left and right side portions) of a front window glass. The molding of JP-A-2003-165137 is formed through injection molding, and is intended to be attached to the side portions (left and right side portions) of the front window glass.

SUMMARY

However, there are the following disadvantages in the molding techniques of JP-A-H03-128721 and JP-A-2003-165137. First, in order to mold a molded product, in which variant cross-sections continue in a longitudinal direction, through the extrusion molding, a special technique or apparatus that changes cross-sections during extrusion is required. Further, the degree of technical difficulty is high, and the manufacturing cost may increase.

Meanwhile, according to the injection molding, there is little difficulty in molding the molded product in which the variant cross-sections continue in the longitudinal direction. However, in order to realize the variant cross-sections, it is necessary to additionally form a portion for raising (build-up) the volume on a back surface of the decorative portion opposite to the front surface of the decorative portion (that is, decorative face) with the same resin material as the decorative portion. Accordingly, a forming mold and a cavity structure that enables the portion for raising the volume on the back surface of the decorative portion to be formed are adopted. However, if an attempt to secure such a volume raising portion as described above is made, a place with thick resin and a place with thin resin are likely to be formed in a longitudinal direction of a molded product, which may cause local sink (recesses) in the decorative face. That is, if there is a local difference in the thickness of molten resin in the longitudinal direction of the product, a difference is also caused in the degree of shrinkage of the molten resin due to the difference in the thickness, which results in impairing the external appearance of the decorative face. More specifically, since the degree of sink is high in places with thick resin and the degree of sink is low in places with thin resin, there is a concern that a difference between the degrees of sink according to positions may cause an adverse effect on the external appearance of the decorative face (for example, there is a concern that an impression that the external appearance is uneven may be given).

Aspects of the invention has been made in view of the above circumstances, and an object thereof is to provide a molding for a vehicle, which is capable of being molded by injection molding and realizing a favorable external appearance, and a method for manufacturing the same.

According to a first aspect of the invention, there is provided an elongated molding for a vehicle, which is configured to be attached to a circumferential edge of a window pane of a vehicle, the molding including: an elongated main body including, a head portion arranged at a front surface side of the circumferential edge of the window pane and providing a decorative face when the molding is attached to the window pane, a leg portion protruding from a back surface of the head portion and being arranged to face an end surface of the circumferential edge of the window pane when the molding is attached to the window pane, and a foot portion protruding from a tip of the leg portion toward a center of the window pane and being arranged at a back surface side of the circumferential edge of the window pane when the molding is attached to the window pane, wherein at least a portion of the main body in a longitudinal direction thereof has a substantially U-shaped cross-sectional shape formed by the head portion, the leg portion, and the foot portion, wherein a volume raising portion is provided integrally with the head portion on the back surface of the head portion, the volume raising portion being provided to at least a portion of the head portion in the longitudinal direction, wherein a thickness of the volume raising portion varies at at least some positions in the longitudinal direction, and wherein the volume raising portion is made of a resin material softer than a resin material constituting the head portion.

Accordingly, the following effects are obtained. That is, since the main body of the elongated molding has a cross-sectional shape that is a substantially U-shape formed by the head portion, the leg portion, and the foot portion, the window pane can be held from the front surface thereof to the back surface thereof. Accordingly, once this molding is mounted on a vehicle, there is no concern that the molding easily slips out of the window pane. Additionally, the volume raising portion that is additionally formed in order to realize variant cross-sections along the longitudinal direction of the main body of the molding is provided integrally with the head portion of the main body, and the thickness of the volume raising portion varies at at least some positions in the longitudinal direction, but the resin material constituting the volume raising portion is different from the resin material constituting the head portion. Therefore, even when the volume raising portion is molded by injection molding, the problems of sink can be lessened (or non-actualized), and the external appearance of the front surface (that is, the decorative face) of the head portion can be kept favorable. Moreover, since the volume raising portion that abuts with the front surface of the circumferential edge of the window pane is made of the resin material softer than the resin material constituting the head portion, damage on the window pane and generation of abnormal noise can be prevented.

According to a second aspect of the invention, there is provided a method for manufacturing the molding for a vehicle according to the first aspect, the method including: performing primary molding by injection-molding a primary molded product including at least the head portion of the main body of the molding; and performing secondary molding by arranging the primary molded product as an insert in a forming mold and injection-molding the volume raising portion to the primary molded product by using the resin material softer than the resin material constituting the head portion.

Accordingly, the following effects similar to the effects of the first aspect can be obtained. That is, according to the method of the invention, the main body including the head portion is injection-molded to mold the primary molded product in advance. Thereafter, the volume raising portion can be injection-molded to the primary molded product on the back side of the head portion to obtain the secondary molded product (finished product). Therefore, even if the molten resin constituting the volume raising portion in the secondary molding process has shown a difference in shrinkage amount according to a difference in thickness of the volume raising portion, the influence of sink caused by the secondary molding process is merely actualized on the back surface of the head portion at the utmost, and the front surface of the head portion (that is, the decorative face) that is already finished in the primary molding process is not influenced at all. Since the injection molding is divided into the two processes (separate processes) on the surface side and back side of the head portion in this way, there is no concern that the external appearance of the decorative face may be impaired even if the volume raising portion is additionally formed in order to realize variant cross-sections in the longitudinal direction.

DETAILED DESCRIPTION

Figure 1:
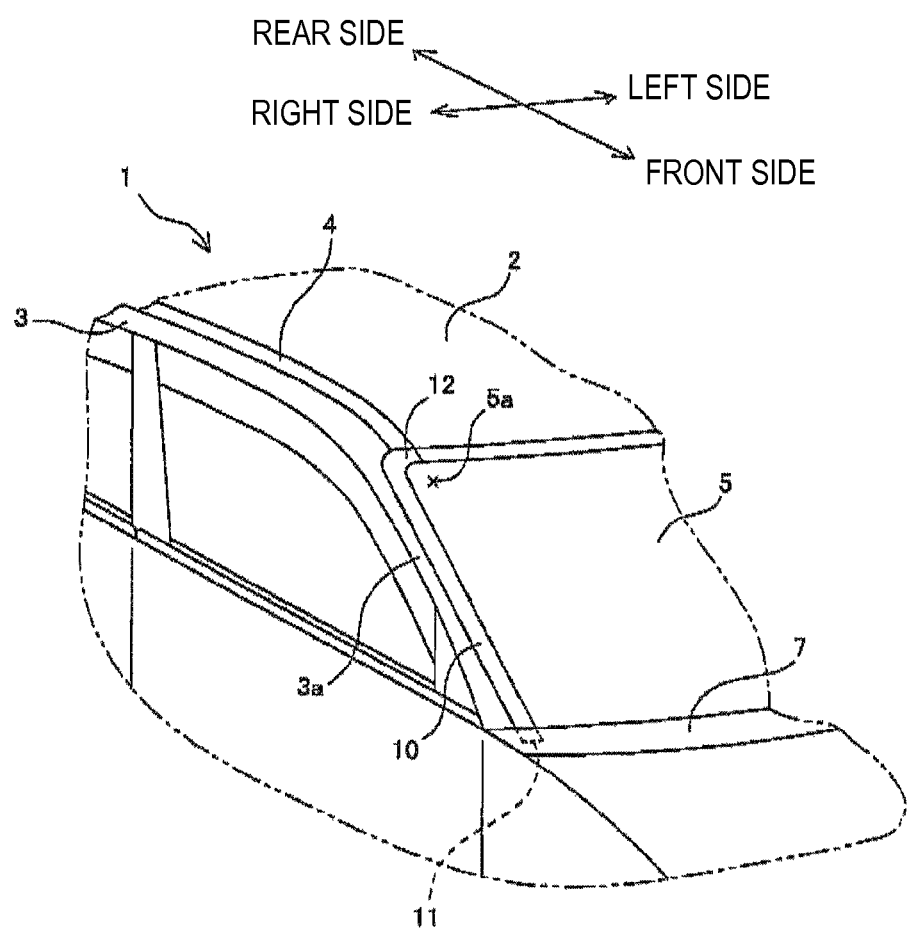
FIG. 1 is a perspective view as viewed from an oblique front side of a vehicle cabin, illustrating a mounting situation of a window molding to a window pane.

Hereinafter, a window molding according to first embodiment of the invention will be described referring to the drawings.

FIG. 1 is a perspective view of a portion of a cabin (passenger cabin) of a general sedan type automobile, as viewed from an oblique front side. As illustrated in FIG. 1, a cabin 1 is surrounded and molded by a roof panel 2 (ceiling portion), side panels 3 located on both left and right sides (only a right side panel is illustrated), and other panel members (not illustrated). Although a panel constituting the cabin 1 is generally made of metal, in an example of FIG. 1, junctions between side portions of the roof panel 2 and the side panels 3 are provided with a roof molding 4 made of resin. The side panels 3 extend further forward than a front edge of the roof panel 2 and obliquely downward. Additionally, front extended portions 3a (generally, referred to as "front pillars" or "A pillars") of the side panels 3 are arranged on both left and right side portions of a front window glass 5 (hereinafter, referred to as "window pane"). Moldings 10 of the present embodiment are elongated resin members that are arranged along the front extended portions 3a of the side panels and are interposed between the front extended portions 3a and the side portions of the window pane 5 to guarantee a decorative function, a waterproof function, and other functions.

Figure 2:
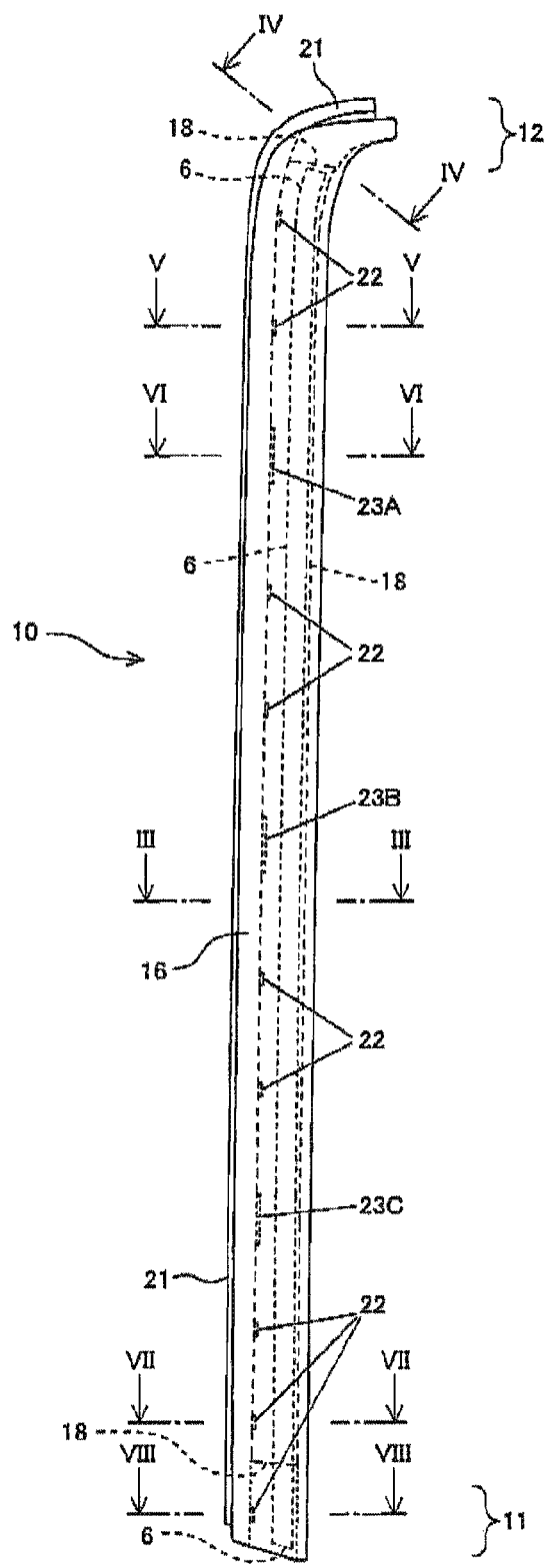
FIG. 2 is a front view of the window molding according to a first embodiment.
Figure 3:
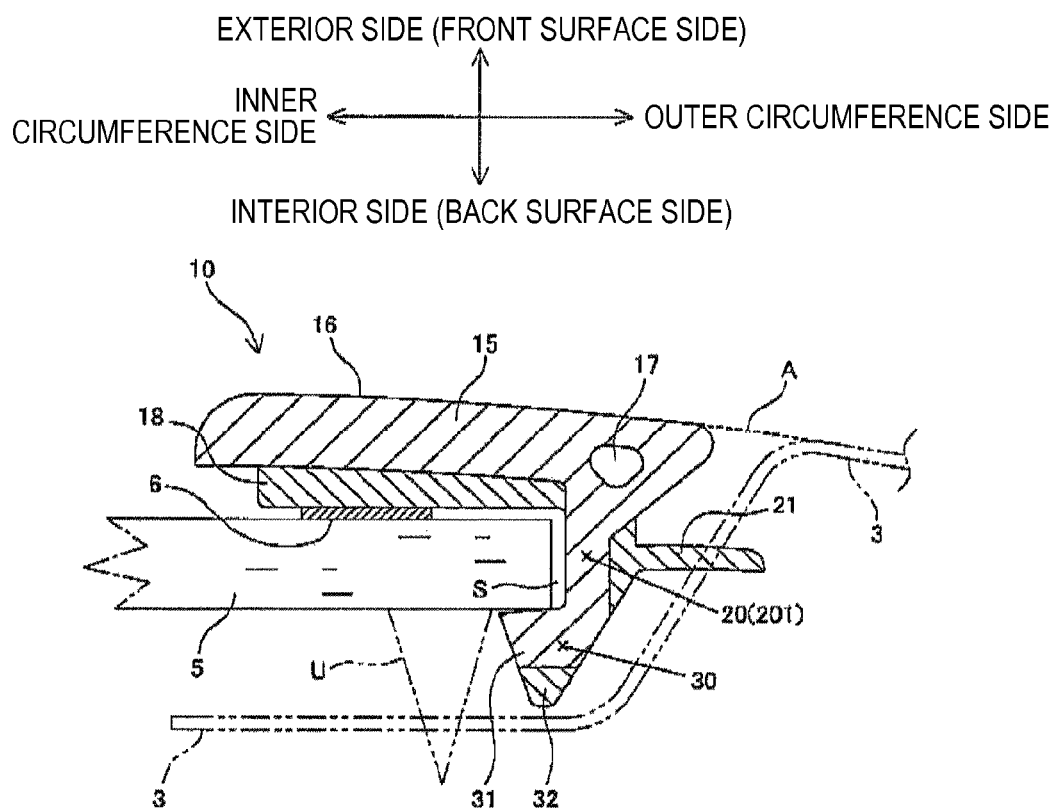
FIG. 3 is an enlarged cross-sectional view taken along line III-III of FIG. 2 at the time of mounting of the window molding to the window pane.

The molding 10 of the present embodiment is attached to a vehicle body together with the window pane 5 after being adhered to the side portion of the window pane 5 forming a portion of a circumferential edge of the window pane 5, using a double faced adhesive tape 6 (refer to FIGS. 2 and 3). In that case, a lower portion 11 (lower end portion) of the molding 10 is put under a cowl portion 7 of the vehicle body. Meanwhile, an upper portion 12 (upper end portion) of the molding 10 is formed in a curved manner corresponding to a corner portion 5a of an upper portion of the window pane, and the corner portion 5a of the upper portion of the window pane is partially covered with the upper portion 12. The upper portion 12 of the molding is arranged adjacent to a front end portion of the roof molding 4.

FIG. 2 is a front view of the molding 10 for a right side interposed between the front extended portion 3a of a right side panel and a right side portion of the window pane 5 of FIG. 1. Although the molding for the right side and a molding for a left side, which is line-symmetrical to the molding for the right side, are mounted on an actual vehicle in a pair, only the molding for the right side will be described in the present specification and drawings.

As illustrated in FIG. 2, a main body of the molding 10 has a vertically long shape, and the upper portion 12 curved leftward with respect to the main body is provided in the vicinity of an upper end portion of the main body. The line IV-IV in FIG. 2 is generally a boundary between the upper portion 12 and a main body portion other than the upper portion. In the main body of the molding, the whole remaining portion other than the upper portion 12 may be referred to as a "side portion". This naming originates from a fact that the remaining portion other than the upper portion 12 is a portion corresponding to the side portion of the window pane 5. The front of the main body of the molding illustrated in FIG. 2 is a front surface, and this front surface corresponds to a decorative face 16. Additionally, although respective portions that are present on a back side of the main body of the molding are drawn by dashed lines in FIG. 2, these portions will be described later with reference to a plurality of cross-sectional views.

The molding 10 of the present embodiment is formed by two-process injection molding using two types of resin materials, that is, a "hard resin (material)" and a "soft resin (material)". Here, the "hard" and the "soft" are terms that express the relative relationship of hardness or softness between these two resin materials. The "hard resin (material)" means a resin material, which is harder than the soft resin (material), and the "soft resin (material)" means a resin material, which is softer than the hard resin (material). Although the hard resin (material) and the soft resin (material) are generally made of different materials, the hard resin (material) and the soft resin (material) can also be prepared from the same kind of resin material, so long as the hard and soft reins (materials) can be separately prepared depending on differences in molecular weight or the presence or absence of a plasticizer and other additives even if substantially the same material is used. Preferable hard resins (materials) include AES resins, ABS resins, PP resins, PPO resins, polycarbonate (PC) resins, polyamide (PA) resins, or alloy resins thereof. Preferable soft resins (materials) include thermo-polyolefin (TPO) resins. TPO is a generic term of thermoplastic olefins (homopolymers or copolymers), behaves like elastomers (elastic bodies) and has rubber-like properties at room temperature, but has unique properties capable of being molded similar to general-purpose plastics. As TPO, those obtained by finely dispersing ethylene-propylene rubber (EPDM, EPM) in polypropylene (PP) can be exemplified. In instances illustrated in FIGS. 2 to 11, acrylonitrileethylene-propylene-dienestyrene (AES) resins are used as the hard resin, and TPO is used as the soft resin.

FIG. 3 illustrates a cross-section taken along line III-III of FIG. 2, that is, a cross-sectional view at a substantially central position of the molding 10 in a longitudinal direction. In cross-sectional views of FIG. 3 and the subsequent drawings (FIGS. 3 to 8), respective upper, lower, left, and right directions (respective sides) on the drawing sheets are referred to in the following manner in association with the window pane 5. That is, on the drawing sheet planes, an upper side is referred to as an "exterior side (front surface side)", a lower side is referred to as an "interior side (back surface side)", a left side is referred to as an "inner circumference side", and a right side is referred to as an "outer circumference side".

As illustrated in FIG. 3, the main body of the molding 10 includes a head portion 15, a leg portion 20, and a foot portion 30. The "head portion 15" indicates a portion that is located at the front surface side of the circumferential edge of the window pane and is arranged further toward the exterior side than the surface of the window pane 5 when the molding 10 is attached to the window pane 5. The "decorative face 16" of the molding 10 is provided by an upper surface 16 of the head portion 15. The "leg portion 20" indicates a portion that protrudes downward (toward the interior side) from the back surface in the vicinity of the end portion of the head portion 15 on the outer circumference side and that faces an end surface of the circumferential edge of the window pane when the molding 10 is attached to the window pane 5. The "foot portion 30" indicates a portion that protrudes toward the center of the window pane 5 from a lower end portion of the leg portion 20 and that is located at the back side of the circumferential edge of the window pane and is arranged further toward the interior side than the back surface of the window pane 5 when the molding 10 is attached to the window pane 5. The cross-sectional shape of the main body of the molding is a substantially U-shape formed by the head portion 15, the leg portion 20, and the foot portion 30. Here, in the present embodiment, although the cross-sectional shape of the main body of the molding is a substantially U-shape over the total length of the main body of the molding, the invention is not limited thereto. For example, the foot portion 30 is intermittently or partially formed in the longitudinal direction of the main body of the molding. As a result, the cross-sectional shape of the main body of the molding may be intermittently or partially a substantially U-shape. In this case, the cross-sectional shape of the main body of the molding is a substantially T-shape in the portion in which the foot portion 30 is not formed.

In the molding 10 of the present embodiment, the head portion 15 is basically formed of a hard resin. Although the leg portion 20 is mostly made of the hard resin, a portion formed of a soft resin is partially included in the leg portion. The foot portion 30 is also formed by combining the hard resin and the soft resin. As illustrated by a dashed line A in FIG. 3, the height and thickness of the head portion 15 is set so that the upper surface 16 of the head portion 15 and the surface of the side panel 3 become substantially flush with each other.

A gas channel 17 is provided within the head portion 15 over the entirety of the head portion 15 in the longitudinal direction and in the vicinity of the boundary between the head portion 15 and the leg portion 20. The gas channel 17 is a trace of when a primary molded product formed of a hard resin is molded by gas injection molding. Additionally, a lip portion 21 made of a soft resin is provided on the outer circumference side of the leg portion 20. The lip portion 21 serves as a waterproof seal as a tip portion thereof abuts on the side panel 3 and is deformed (however, a non-deformed state is illustrated in cross-sectional views of FIG. 3 and other drawings). Meanwhile, at a cross-sectional position of FIG. 3, the end surface of the window pane 5 does not abut on an inner circumference side lateral surface of the leg portion 20, and a gap S is formed between both the surfaces. Additionally, an upper half portion 31 of the foot portion 30 that comes into contact with the back surface of the window pane 5 is basically formed of a hard resin, and a lower half portion 32 that comes into contact with the side panel 3 is formed of a soft resin.

Moreover, as illustrated in FIG. 3, the volume raising portion 18 is formed integrally with the head portion 15 on the back surface of the head portion 15 so as to fill a space between the head portion 15 and the window pane 5. The head portion 15 is made of the hard resin, whereas the volume raising portion 18 is made of a soft resin. As illustrated in FIG. 2, the volume raising portion 18 is provided along the head portion 15 over a wide range from a lower side of line IV-IV of FIG. 2 to a lower side of line VII-VII of FIG. 2. Additionally, the total length of the volume raising portion 18 along the head portion 15 is approximately equal to the length of the side portion of the window pane 5. However, the thickness (t) of the volume raising portion 18 is not necessarily equal at respective positions along the longitudinal direction (described later with reference to FIGS. 4 to 8).

As illustrated in FIG. 3, the double faced adhesive tape 6 is interposed between a lower surface of the volume raising portion 18 and an upper surface (front surface) of the window pane 5, and the molding 10 is fixed to the window pane 5 by the double faced adhesive tape 6. As illustrated in FIG. 2, the double faced adhesive tape 6 is adhered along the head portion 15 over a wide range from the lower side of line IV-IV in FIG. 2 to a portion immediately before a lower edge of the main body of the molding. As can be seen from FIG. 2, the width of the double faced adhesive tape 6 is narrower than the width (a length in a horizontally traversing direction in FIG. 2) of the volume raising portion 18.

A urethane sealant U (illustrated by an imaginary line in FIG. 3) may be put along the foot portion 30 of the molding between the side panel 3 and the window pane 5.

Figure 4:
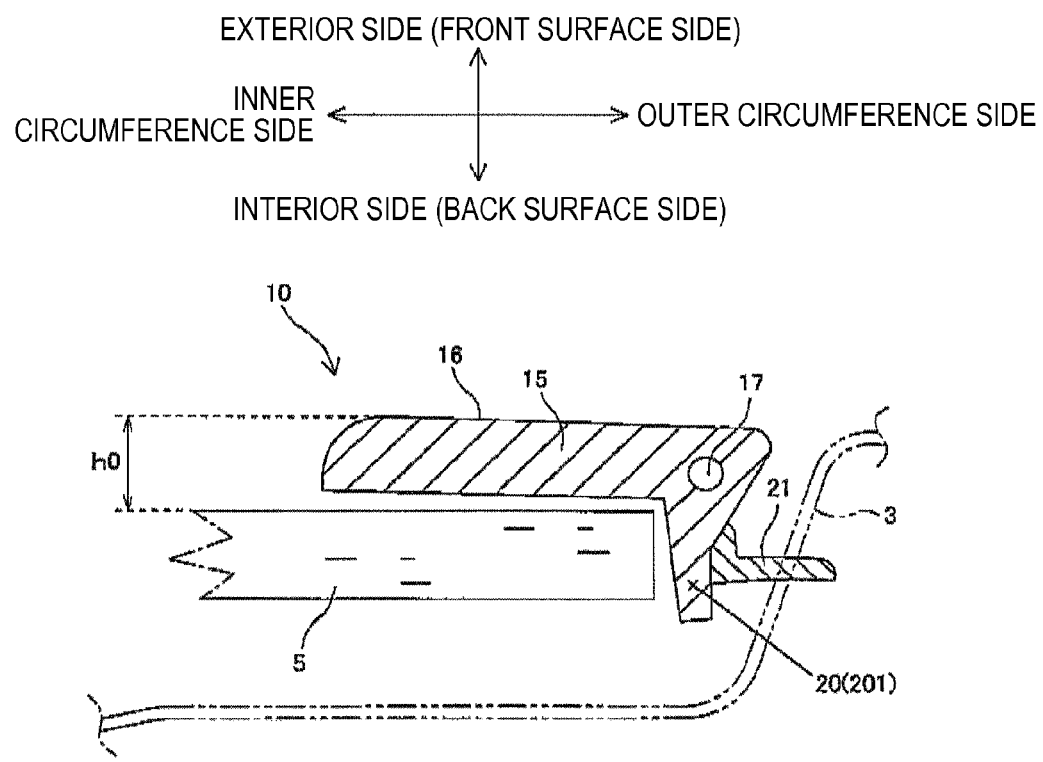
FIG. 4 is an enlarged cross-sectional view taken along line IV-IV of FIG. 2 at the time of mounting of the window molding to the window pane.

FIG. 4 illustrates a cross-section taken along line IV-IV of FIG. 2, that is, a cross-section of the upper portion 12 of the molding 10 at a position near the boundary with the side portion. Although the molding 10 (upper portion 12) at this cross-sectional position has the head portion 15 and the leg portion 20 both of which are made of the hard resins and the lip portion 21 made of a soft resin, the foot portion 30 is not included (however, the foot portion may be provided). Additionally, the volume raising portion 18 is not provided (if the thickness of the volume raising portion 18, in which the back surface of the head portion 15 as a reference line, is defined as t, t=0). If the height or distance from the front surface of the window pane 5 to a front surface (upper surface 16) of the head portion 15 is defined as h, h=h0 is set at the position of FIG. 4.

Figure 5:
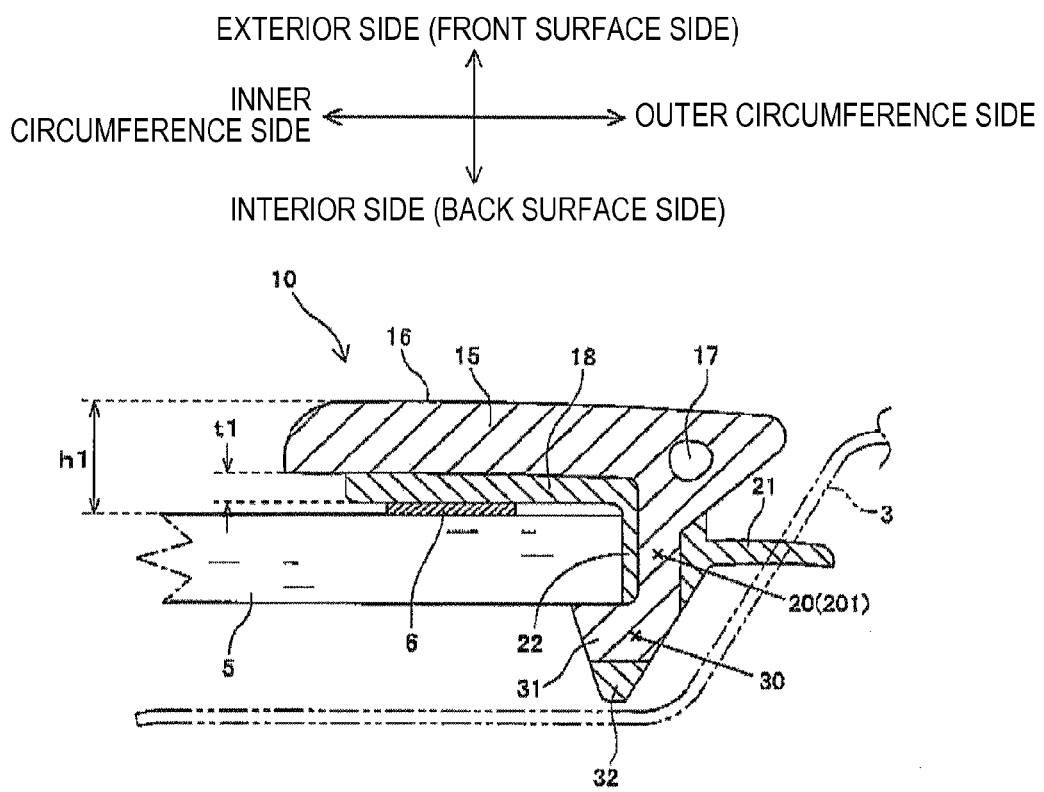
FIG. 5 is an enlarged cross-sectional view taken along line V-V of FIG. 2 at the time of mounting of the window molding to the window pane.
Figure 6:
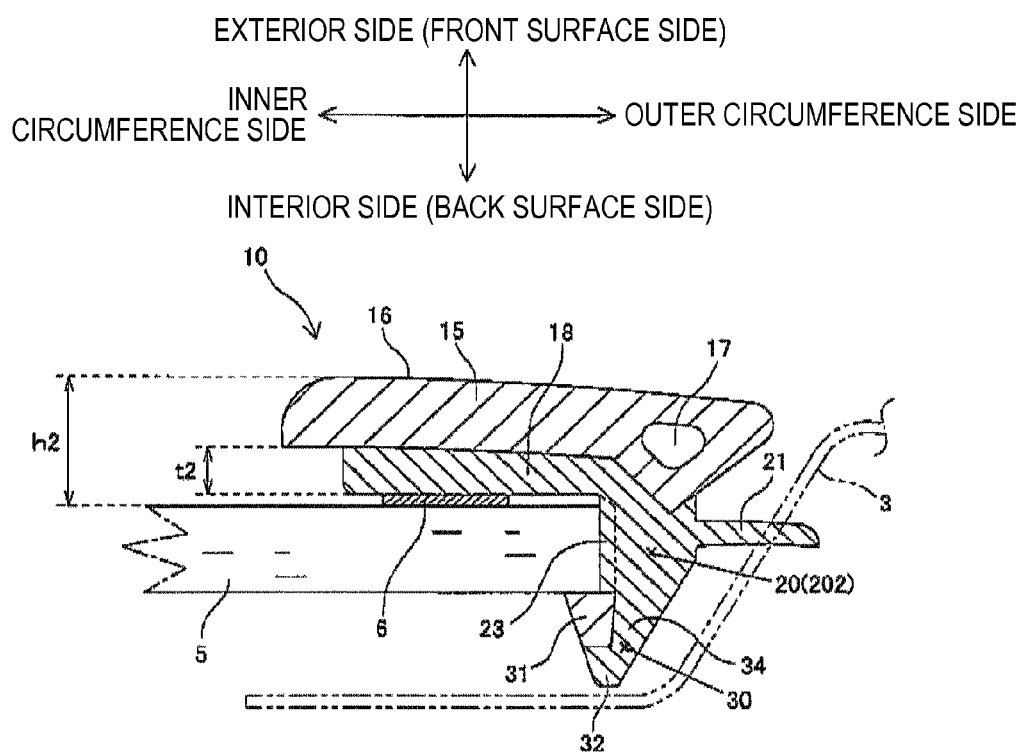
FIG. 6 is an enlarged cross-sectional view taken along line VI-VI of FIG. 2 at the time of mounting of the window molding to the window pane.

FIG. 5 illustrates a cross-section taken along line V-V of FIG. 2, that is, a cross-section at a position where a rib portion 22 is provided, on the inner circumference side of the leg portion 20, in the side portion of the molding 10. FIG. 6 illustrates a cross-section taken along line VI-VI of FIG. 2, that is, a cross-section at a position where a thick portion 23 is provided, on the inner circumference side of the leg portion 20 in the side portion of the molding 10. As illustrated by a dash line in FIG. 2 (front view) and illustrated in FIG. 9 (a side view of a partial interval), a plurality of (a total of nine in the present example) the rib portions 22 and a plurality of (a total of three in the present example) the thick portions 23 are provided on the inner circumference lateral surface of the leg portion 20 of the molding 10 so as to protrude at intervals (that is, intermittently) in the longitudinal direction. Both of the rib portions 22 and the thick portions 23 are formed of soft resins, and function as cushion projections that abut on the end surface of the circumferential edge of the window pane and prevent a damage of the window pane 5 or generation of abnormal noise when the molding 10 is attached to the window pane 5. The designation of the "rib portions 22" and the "thick portions 23" originates from the relative width and narrowness of the respective portions in a side view (refer to FIG. 9), where relatively narrow rib-shaped ridges are referred to as the "rib portions 22" and relatively wide belt-shaped projections are referred to as the "thick portions 23". According to FIG. 2, three thick portions (23A, 23B, and 23C in order from the upper side) are arranged at three places where the total length of the side portion of the molding 10 is almost divided into four. Also, two rib portions 22 are arranged at two places between the upper portion 12 and an upper thick portion 23A, two rib portions 22 are arranged at two places between the upper thick portion 23A and a middle thick portion 23B (refer to FIG. 9), two rib portions 22 are arranged at two places between the middle thick portion 23B and a lower thick portion 23C, and three rib portions 22 are arranged at three places lower than the lower thick portion 23C.

As illustrated in FIG. 5, at this position, a main framework portion of the leg portion 20 is formed of the same hard resin as the head portion 15. Hereinafter, the portion of the leg portion 20 that is formed of the same hard resin as the head portion 15 is referred to as a "main portion 201 of the leg portion 20". Additionally, the lip portion 21 made of the soft resin is provided on the outer circumference side of the leg portion 20 (main portion 201), and a rib portion 22 made of the soft resin is provided on the inner circumference side lateral surface (surface facing the end surface of the window pane 5) of the leg portion 20. The rib portion 22 extends lengthwise from the interior side to the exterior side, and an upper end portion (exterior side end portion) of the rib portion 22 is formed continuously with the volume raising portion 18. At a cross-sectional position of FIG. 5, the height h from the front surface of the window pane 5 to the front surface (upper surface 16) of the head portion 15 is set to h=h1, and this height h1 is greater than the height h0 in FIG. 4 (h0<h1). Additionally, the thickness t of the volume raising portion 18 is set to t=t1.

Figure 10:
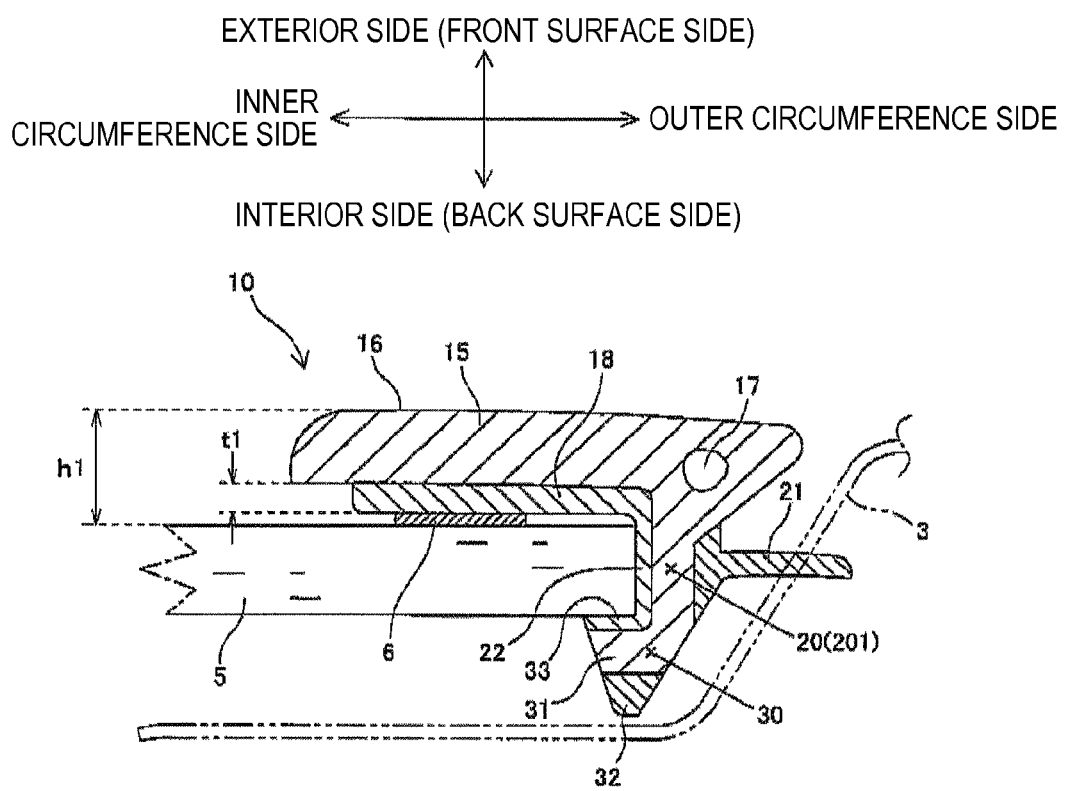
FIG. 10 is a cross-sectional view equivalent to FIG. 5, illustrating a modification example of the molding.

A modification example of the cross-section of FIG. 5 is illustrated in FIG. 10. As illustrated in FIG. 10, a cushion abutting portion 33 made of a soft resin may be formed at a portion of the upper half portion 31 of the foot portion 30 that directly comes into contact with the back surface of the window pane 5. The cushion abutting portion 33 also contributes to prevention of the generation of abnormal noise, similar to the rib portions 22 or the like. The cushion abutting portion 33 does not need to be a layered portion that is planarly developed, and may be provided as a rib-like projection.

As illustrated in FIG. 6, at this position, the framework portion of the leg portion 20 is formed of the same soft resin as the volume raising portion 18. Hereinafter, the portion of the leg portion 20 that is formed of the same soft resin as the volume raising portion 18 and connected to the volume raising portion 18 is referred to as a "filled portion 202 of the leg portion 20". The lip portion 21 made of the soft resin is provided on the outer circumference side of the leg portion 20 (filled portion 202). The filled portion 202 and the lip portion 21 are made of the same material. Meanwhile, a thick portion 23 (23A of FIG. 9) made of a soft resin is provided on the inner circumference lateral surface (surface facing the end surface of the window pane 5) of the leg portion 20 (filled portion 202). The thick portion 23 extends in the longitudinal direction from the interior side to the exterior side, and an upper end portion (exterior side end portion) of the thick portion 23 is formed continuously with the volume raising portion 18. The leg portion 20 (filled portion 202) and the thick portion 23 are made of the same material. The position of a boundary line (dashed boundary line) between the leg portion 20 (filled portion 202) and the thick portion 23, which is drawn by a vertical dashed line in FIG. 6, corresponds to the position of the inner circumference side lateral surface of the leg portion 20 of FIG. 3. Accordingly, the thickness of the thick portion 23 illustrated in FIG. 6 is equivalent to the clearance (gap width) of the gap S of FIG. 3. As can be seen from FIG. 9, the width (length in the longitudinal direction of the molding 10) of the thick portion 23 is a size approximately six times greater than the width of the rib portion 22, and the thick portion 23 is a wide belt-shaped projection.

Additionally, as illustrated in FIG. 6, a half of the outer circumference side 34 of the upper half portion 31 of the foot portion 30 is formed of the same soft resin as the lower half portion 32 of the foot portion and the leg portion 20 (filled portion 202). That is, the leg portion 20 (filled portion 202) and the lower half portion 32 of the foot portion are connected to each other via the half of the outer circumference side 34 of the upper half portion 31 of the foot portion 30 made of the same soft resin.

Moreover, as illustrated in FIG. 6, the height h from the front surface of the window pane 5 to the front surface (upper surface 16) of the head portion 15 is set to h=h2, and this height h2 is greater than the height h0 in FIG. 4 and the height h1 in FIG. 5 (h0<h1<h2). That is, the height h of the head portion 15 with respect to the front surface of the window pane becomes greater gradually from the vicinity of the boundary with the upper portion 12 to the center of the molding 10. However, the height h substantially reaches a peak at h2. Additionally, the thickness t of the volume raising portion 18 is set to t=t2, and this thickness t2 is greater than the thickness t1 in FIG. 5 (t1<t2). That is, similar to the height h of the head portion 15, the thickness t of the volume raising portion 18 tends to become higher gradually toward the center of the molding 10. However, the thickness t also substantially reaches a peak at t2.

Although FIG. 6 illustrates a cross-sectional situation at the position of the upper thick portion 23A, the cross-sectional situations are also substantially the same at the respective positions of the middle thick portion 23B and the lower thick portion 23C. That is, to describe the leg portion 20 provided to extend along the main body of the molding, in the leg portion 20, the filled portions 202 (soft resin portions) located at the back or deep sides of the respective thick portions 23 are set at the respective positions where the three thick portions 23A, 23B, and 23C are provided (refer to FIG. 6). Portions other than the three filled portions 202 that are intermittently arranged constitute the main portion 201 (hard resin portion) of the leg portion 20 (refer to FIGS. 3, 4, 5, 7, and 8). In this way, the leg portion 20 of the main body of the molding is formed by integrating the main portion 201 made of the same hard resin as the head portion 15, and the three filled portions 202 of the main portion 201 made of the soft resin that are intermittently arranged along the longitudinal direction of the main body of the molding.

Additionally, with respect to the height h from the front surface of the window pane 5 to the front surface (upper surface 16) of the head portion 15, and the thickness t of the volume raising portion 18, the height h and the thickness t at the respective positions of the middle thick portion 23B and the lower thick portion 23C are approximately equal to the height h2 and the thickness t2 at the position of the upper thick portion 23A. That is, in the central interval of the main body of the molding from the upper thick portion 23A to the lower thick portion 23C, the height h of the head portion 15 is substantially constant at h=h2, and the thickness t of the volume raising portion 18 is substantially constant at t=t2.

Figure 7:
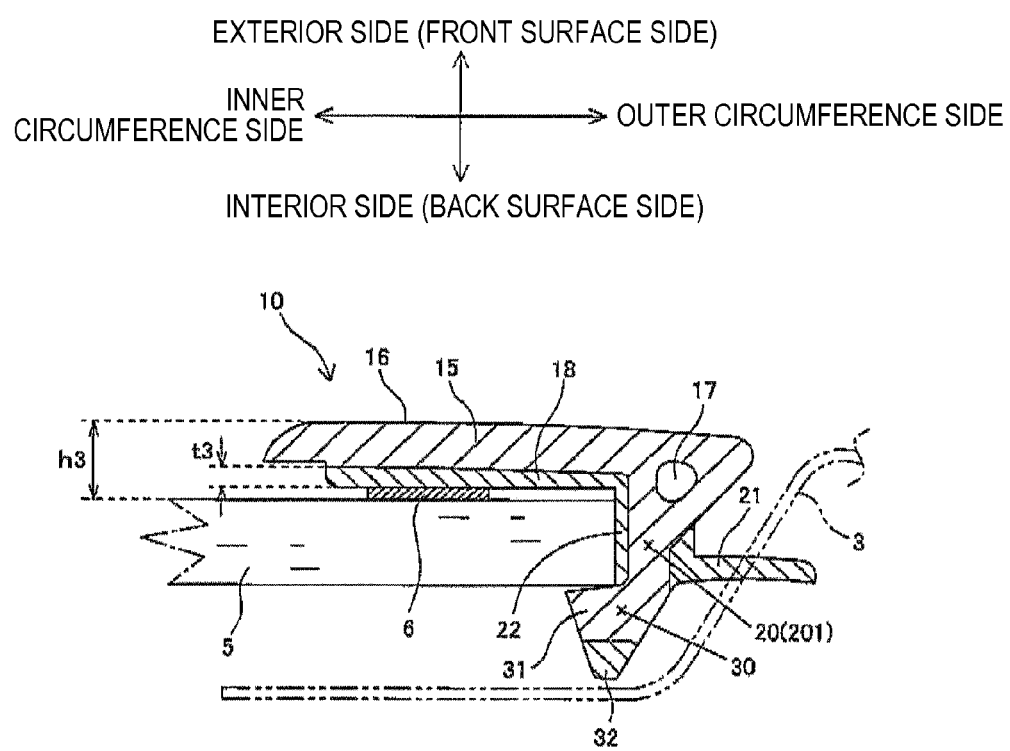
FIG. 7 is an enlarged cross-sectional view taken along line VII-VII of FIG. 2 at the time of mounting of the window molding to the window pane.

FIG. 7 illustrates a cross-section taken along line VII-VII of FIG. 2, that is, a cross-section at a position where a rib portion 22 is present, at the vicinity of a lower end of the side portion of the molding 10 (a position nearest to the lower portion 11). At this position, the main portion 201, which is formed of the same hard resin as the head portion 15, occupies the leg portion 20, and the lip portion 21 made of the soft resin is provided on the outer circumference side of the leg portion 20 (main portion 201). Additionally, the rib portion 22 made of the soft resin is provided on the inner circumference side lateral surface (surface facing the end surface of the window pane 5) of the leg portion 20, similar to FIG. 5, and the upper end portion (exterior side end portion) of the rib portion 22 is formed continuously with the volume raising portion 18. At a cross-sectional position of FIG. 7, the height h from the front surface of the window pane 5 to the front surface (upper surface 16) of the head portion 15 is set to h=h3, and this height h3 is lower than the height h2 in FIG. 6 (h3<h2). Additionally, the thickness t of the volume raising portion 18 is set to t=t3, and this thickness t3 is smaller than the thickness t2 in FIG. 6 (t3<t2). That is, the thickness t of the volume raising portion 18 becomes smaller gradually from the lower thick portion 23C toward the lower portion 11.

Figure 8:
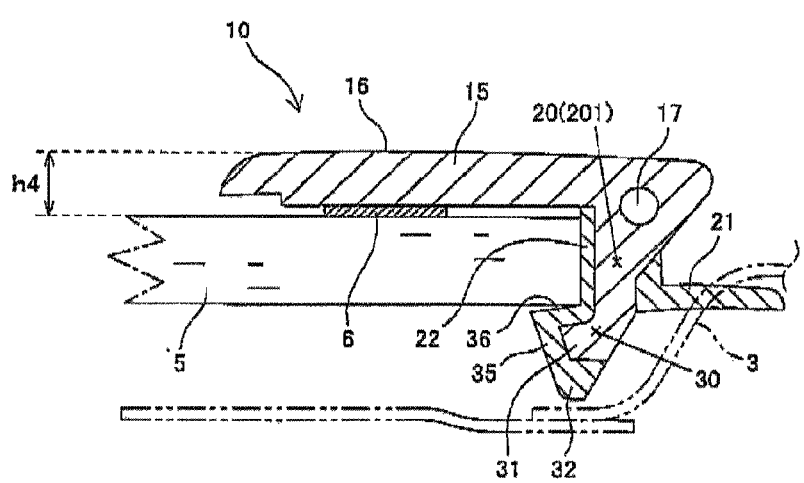
FIG. 8 is an enlarged cross-sectional view taken along line VIII-VIII of FIG. 2 at the time of mounting of the window molding to the window pane.
Figure 9:
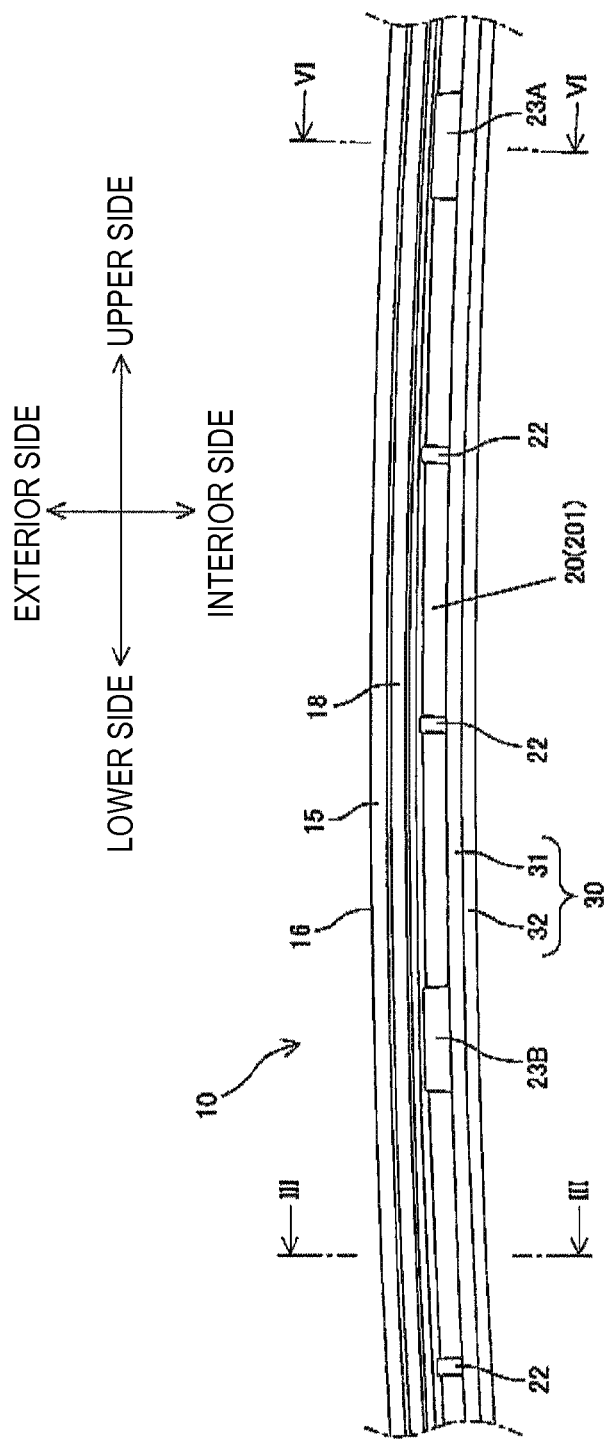
FIG. 9 is a partially enlarged side view of the molding as viewed from the window pane side, in an interval between cross-sectional line III-III and cross-sectional line VI-VI of FIG. 2.

FIG. 8 illustrates a cross-section taken along line VIII-VIII of FIG. 2, that is, a cross-section at a position where a rib portion 22 is present, at the lower portion 11 of the molding 10. At this position, the volume raising portion 18 is not present on the back surface of the head portion 15 (t=0), and the back surface of the head portion 15 is directly fixed to the front surface of the window pane 5 by the double faced adhesive tape 6. Additionally, at this position, the main portion 201, which is formed of the same hard resin as the head portion 15, occupies the leg portion 20, and the lip portion 21 made of the soft resin is provided on the outer circumference side of the leg portion 20 (main portion 201). Additionally, the rib portion 22 made of the soft resin is provided on the inner circumference lateral surface (surface facing the end surface of the window pane 5) of the leg portion 20, similar to FIGS. 5 and 7.

Moreover, a portion 36 of the upper half portion 31 of the foot portion 30 that directly comes into contact with an inner circumference side lateral portion 35 and the back surface of the window pane 5 is formed of the same soft resin as the lower half portion 32 of the foot portion and the rib portion 22. The portion 36 formed of the soft resin functions as at least a cushion abutting portion that contributes to prevention of the generation of abnormal noise, or the like, similar to the rib portion 22. At a cross-sectional position of FIG. 8, the height h from the front surface of the window pane 5 to the front surface (upper surface 16) of the head portion 15 is set to h=h4, and this height h4 is still lower than the height h3 in FIG. 7 (h4<h3<h2). That is, the height h of the head portion 15 is set so as to become lower gradually from the lower thick portion 23C toward the lower portion 11.

Next, a method for manufacturing the molding 10 of the present embodiment will be described. The molding 10 is manufactured through two injection-molding processes including a primary molding process of injection-molding a primary molded product (intermediate body) by using a hard resin, and a secondary molding process of using the primary molded product as an insert and injection-molding a secondary molded product by using a soft resin.

The primary molding process is a process of gas-injection-molding the portion of the main body of the molding that is made of the hard resin (that is, the main framework portion). A primary molded product P1 (refer to FIG. 11), in which the head portion 15, the main portion 201 of the leg portion 20, and the hard resin portion of the foot portion 30 (for example, the upper half portion 31 of the foot portion) in the molding are formed as an integral article, is molded by this first injection molding. In this primary molding process, only the main portion 201 of the leg portion 20 is molded, and the leg portion 20 only including of the main portion 201 has a shape in which places serving as the filled portions 202 (three places corresponding to the thick portions 23) are intermittently cut out. Since the primary molded product P1 has a shape in which portions of the main portion 201 of the leg portion are intermittently cut out along a longitudinal direction of the primary molded product P1, the degree of shrinkage after the molding of the primary molded product P1 in the longitudinal direction can be kept low. As a result, deflection or twisting of the main body of the molding resulting from the shrinkage after the molding can be suppressed.

Figure 11:
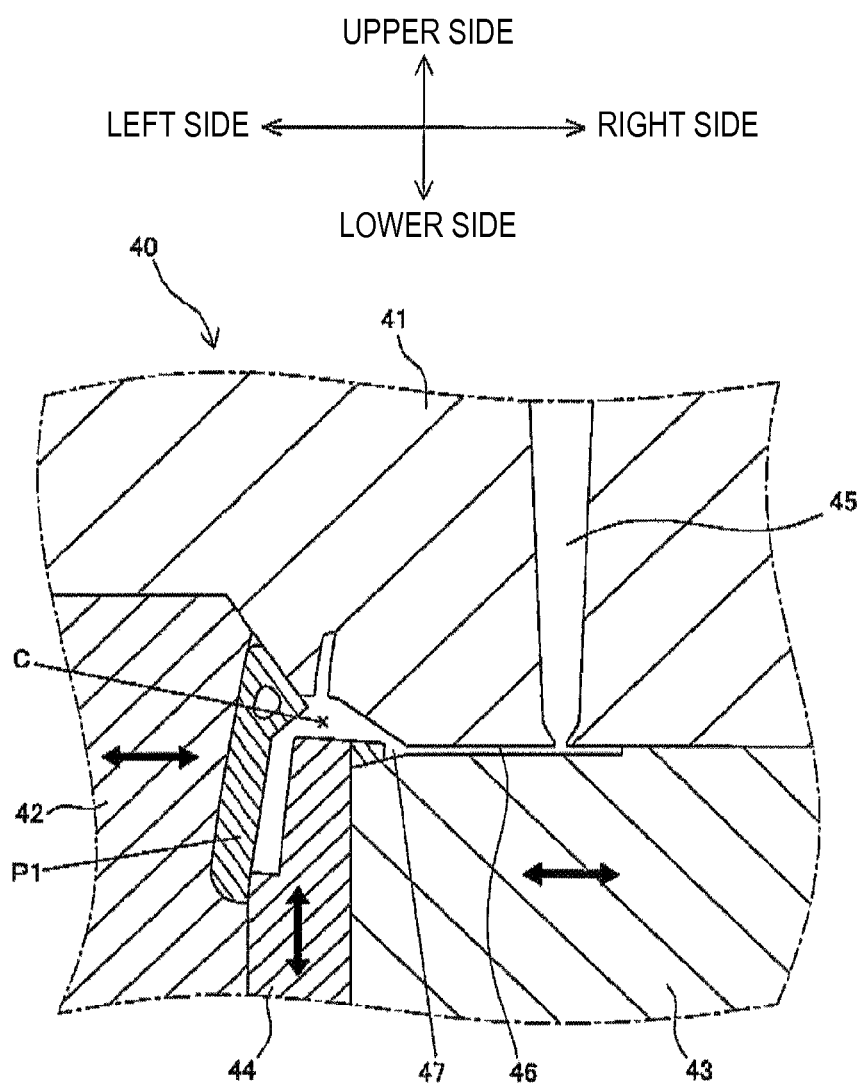
FIG. 11 is a schematic cross-sectional view illustrating an outline of a molding mechanism used in a secondary molding process.

The secondary molding process is a process of adding a portion made of a soft resin to the primary molded product P1 as an insert through injection molding. More specifically, the injection molding is performed using a molding mechanism 40 as illustrated in FIG. 11. The molding mechanism 40 of FIG. 11 includes a fixed mold 41, a movable mold 44 capable of approaching and separating from the fixed mold 41, and a left slide core 42 and a right slide core 43 capable of advancing and retracting on both left and right sides of the movable mold 44. When injection molding is performed, first, the primary molded product P1 as an insert is set on the movable mold 44 that has separated from the fixed mold 41, and then, the left slide core 42 and the right slide core 43 are advanced toward the movable mold 44 and positioned as illustrated in FIG. 11. Subsequently, the movable mold 44, the left slide core 42 and the right slide core 43 are brought close to the fixed mold 41 and arranged at a molding position illustrated in FIG. 11, whereby the movement of the primary molded product P1 is constrained and the primary molded product P1 is held at a predetermined position. In this way, a cavity C is constructed by the primary molded product P1 and the inner surfaces of the respective molds and cores. The cavity C is filled with a soft resin in a molten state via a sprue 45 provided in the fixed mold 41, a runner 46 formed between the fixed mold 41 and the right slide core 43, and a gate 47 set at a position on the tip of the runner 46. In this way, a secondary molded product in which the volume raising portion 18 and the other portions made of the soft resin are added to the primary molded product P1 is formed. The three thick portions 23 that are intermittently arranged along the longitudinal direction of the molding 10 are formed at positions where the gate 47 is present. The runner portion is removed after the secondary molded product is released from the molding mechanism 40.

The secondary molded product in which the volume raising portion 18, the filled portions 202 of the leg portion 20, the lower half portion 32 of the foot portion 30, and the other soft resin portions (for example, lip portion 21, the rib portions 22, the thick portions 23, portions 33, 34, 35, and 36, and the like) are integrated with the primary molded product P1 is obtained by the second injection molding. In this secondary molding, the filled portions 202 made of the soft resin are formed in the respective places of the main portion 201 of the leg portion that are intermittently cut out. By intermittently arranging the soft material in the hard material in this way, it is possible to suppress the rigidity of the entire molding to guarantee a predetermined flexibility, and it is easy to make the molding 10 to follow variations (dimensional errors or the like for every manufacturing lot) in the shapes of the window pane 5 and the side panels 3 of the vehicle.

According to the present embodiment, the main body including the head portion 15 is injection-molded to mold the primary molded product P1 in advance. Thereafter, the volume raising portion 18 can be injection-molded to the primary molded product P1 on the back side of the head portion 15 to obtain the secondary molded product (finished product). Therefore, even if the molten resin constituting the volume raising portion 18 in the secondary molding process has shown a difference in shrinkage amount according to a difference in thickness (t) at respective positions of the volume raising portion 18, the influence of sink caused by the secondary molding process is merely actualized on the back surface of the head portion 15 at the utmost, and the front surface of the head portion 15 (that is, the decorative face 16) that is already finished in the primary molding process is not influenced at all. Since the injection molding is divided into the two processes (separate processes) on the front surface side and back surface side of the head portion 15 in this way, there is no concern that the external appearance of the decorative face 16 may be impaired even if the volume raising portion 18 is additionally formed in order to realize variant cross-sections along the longitudinal direction. Incidentally, the volume raising portion 18 that comes in contact with the front surface of the circumferential edge of the window pane 5 is made of the resin material softer than the resin material constituting the head portion 15, so that the damage of the window pane 5 and the generation of the abnormal noise of the window pane 5 can be prevented.

Other advantages and features of the present embodiment will be listed below.

Since the molding 10 of the present embodiment is mainly fixed to the window pane 5 by the double faced adhesive tape 6 adhered to the back surface of the volume raising portion 18, mounting work to the window pane 5 is easy. Additionally, since the double faced adhesive tape 6 is used rather than glue, the molding 10 can be temporarily fixed during mounting work to the window pane 5, and it becomes possible to flexibly deal with even subtle alignment. Additionally, since the width of the volume raising portion 18 is greater than the width of the double faced adhesive tape 6 in the direction of the cross-section of the molding 10, a side edge of the tape 6 does not protrude to the outside of the volume raising portion 18, and there is no concern that aesthetic appearance may be impaired.

The lip portion 21 that protrudes outward (outer circumferential direction) is provided on the outer circumference side of the leg portion 20 of the molding 10. The lip portion 21 is able to perform a function, such as windproofing by abutting on a body (vehicle body) to block a gap between the window pane 5 and the body.

In the molding 10 of the present embodiment, the portions made of soft resin (for example, the lip portion 21 and the lower half portion 32 of the foot portion) are continuously formed over the entire longitudinal direction of the main body of the molding. For this reason, even when the soft resin portions abuts on the body (vehicle body) or the window pane 5, the abutting states thereof are stable, and the generation of abnormal noise, or the like can be effectively prevented.

The portion in which the thickness t of the volume raising portion 18 gradually increases towards the lower side when the molding is attached to a vehicle (specifically, the interval of $t=0<t1<t2$ from the cross-sectional line IV-IV of FIG. 2 to the cross-sectional line VI-VI thereof) is present at the volume raising portion 18 of the main body of the molding. This portion with gradually increasing thickness catches the water that has been wiped off by wipers and has flown to the side portions of the window pane 5 and guides the water upward or downward from the side portions of the window pane, so that the water can be prevented from getting over the molding and flowing to side windows.

The upper portion 12 located at the upper end of the molding 10 is formed in a curved manner corresponding to the shape of the corner portion 5a of the upper portion of the window pane. Therefore, according to this molding 10, the portion from the corner portion 5a of the upper portion of the window pane to the lower end of the window pane 5 can be continuously covered. Therefore, aesthetic appearance is excellent.

The present invention provides illustrative, non-limiting examples as follows:

(1) In a first example, there is provided an elongated molding for a vehicle, which is configured to be attached to a circumferential edge of a window pane of a vehicle, the molding including: an elongated main body including, a head portion arranged at a front surface side of the circumferential edge of the window pane and providing a decorative face when the molding is attached to the window pane, a leg portion protruding from a back surface of the head portion and being arranged to face an end surface of the circumferential edge of the window pane when the molding is attached to the window pane, and a foot portion protruding from a tip of the leg portion toward a center of the window pane and being arranged at a back surface side of the circumferential edge of the window pane when the molding is attached to the window pane, wherein at least a portion of the main body in a longitudinal direction thereof has a substantially U-shaped cross-sectional shape formed by the head portion, the leg portion, and the foot portion, wherein a volume raising portion is provided integrally with the head portion on the back surface of the head portion, the volume raising portion being provided to at least a portion of the head portion in the longitudinal direction, wherein a thickness of the volume raising portion varies at at least some positions in the longitudinal direction, and wherein the volume raising portion is made of a resin material softer than a resin material constituting the head portion.

Accordingly, the following effects are obtained. That is, since the main body of the elongated molding has a cross-sectional shape that is a substantially U-shape formed by the head portion, the leg portion, and the foot portion, the window pane can be held from the front surface thereof to the back surface thereof. Accordingly, once this molding is mounted on a vehicle, there is no concern that the molding easily slips out of the window pane. Additionally, the volume raising portion that is additionally formed in order to realize variant cross-sections along the longitudinal direction of the main body of the molding is provided integrally with the head portion of the main body, and the thickness of the volume raising portion varies at at least some positions in the longitudinal direction, but the resin material constituting the volume raising portion is different from the resin material constituting the head portion. Therefore, even when the volume raising portion is molded by injection molding, the problems of sink can be lessened (or non-actualized), and the external appearance of the front surface (that is, the decorative face) of the head portion can be kept favorable. Moreover, since the volume raising portion that abuts with the front surface of the circumferential edge of the window pane is made of the resin material softer than the resin material constituting the head portion, damage on the window pane and generation of abnormal noise can be prevented.

(2) In a second example, there is provided the molding for a vehicle according to the first example, wherein the leg portion of the main body includes, a main portion made of the same resin material as the resin material constituting the head portion, and a plurality of filled portions that are provided in the main portion and are intermittently arranged in the longitudinal direction of the main body, and wherein each filled portion of the leg portion is made of the same resin material as the resin material constituting the volume raising portion.

Accordingly, in addition to the effects of the first example, the following effects can be further obtained. That is, in the leg portion, the plurality of filled portions, which are provided in the main portion made of the same hard resin material as the resin material constituting the head portion and are made of the resin material softer than the resin material constituting the head portion, are intermittently arranged in the longitudinal direction. That is, in the primary injection molding, only the main portion in a state where portions which become the filled portions by the secondary injection molding are intermittently cut out is molded. Therefore, the degree of shrinkage after the molding in the longitudinal direction can be kept low. As a result, deflection or twisting of the main body of the molding resulting from the shrinkage after the molding can be suppressed. Additionally, in the leg portion, by the second injection molding, the filled portions made of a relatively soft resin material are formed to a plurality of places that are intermittently cut out. By intermittently arranging the soft material in the hard resin in this way, it is possible to suppress the rigidity of the entire molding to guarantee a predetermined flexibility, and it becomes easy to make the molding to follow variations (dimensional errors or the like for every manufacturing lot) in the shapes of the window pane and the vehicle body panels.

(3) In a third example, there is provided the molding for a vehicle according to the first or second example, wherein a plurality of cushion projections are intermittently arranged in the longitudinal direction of the main body on an inner circumferential lateral surface of the leg portion that faces the end surface of the circumferential edge of the window pane, and wherein the plurality of cushion projections are made of the same resin material as the resin material constituting the volume raising portion.

Accordingly, in addition to the effects of the first or second examples, the following effects can be further obtained. That is, the leg portion does not directly abut on the end surface of the circumferential edge of the window pane, but the cushion projections made of the soft material abut on the end surface of the circumferential edge of the window pane. Therefore, the damage of the window pane and the generation of abnormal noise can be prevented.

(4) In a fourth example, there is provided the molding for a vehicle according to any one of the first to third examples, wherein a portion of the foot portion, which abuts on the window pane or a vehicle body panel when the molding is attached to the window pane, is formed with a cushion abutting portion, which is made of a resin material softer than a resin material constituting the foot portion other than the cushion abutting portion.

Accordingly, in addition to the effects of any one of the first to third examples of the invention, the following effects can be further obtained. That is, since the cushion abutting portion made of the soft material is formed at the portion of the foot portion that abuts on the window pane or a vehicle body panel, the generation of abnormal noise can be prevented.

(5) In a fifth example, there is provided a method for manufacturing the molding for a vehicle according to the first example, the method including: performing primary molding by injection-molding a primary molded product including at least the head portion of the main body of the molding; and performing secondary molding by arranging the primary molded product as an insert in a forming mold and injection-molding the volume raising portion to the primary molded product by using the resin material softer than the resin material constituting the head portion.

Accordingly, the following effects similar to the effects of the first example can be obtained. That is, according to the method of the invention, the main body including the head portion is injection-molded to mold the primary molded product in advance. Thereafter, the volume raising portion can be injection-molded to the primary molded product on the back side of the head portion to obtain the secondary molded product (finished product). Therefore, even if the molten resin constituting the volume raising portion in the secondary molding process has shown a difference in shrinkage amount according to a difference in thickness of the volume raising portion, the influence of sink caused by the secondary molding process is merely actualized on the back surface of the head portion at the utmost, and the front surface of the head portion (that is, the decorative face) that is already finished in the primary molding process is not influenced at all. Since the injection molding is divided into the two processes (separate processes) on the surface side and back side of the head portion in this way, there is no concern that the external appearance of the decorative face may be impaired even if the volume raising portion is additionally formed in order to realize variant cross-sections in the longitudinal direction.

What is claimed is:

1. An elongated molding for a vehicle, which is configured to be attached to a circumferential edge of a window pane of a vehicle, the molding comprising:
   an elongated main body including,
      a head portion arranged at a front surface side of the circumferential edge of the window pane and providing a decorative face when the molding is attached to the window pane,
      a leg portion protruding from a back surface of the head portion and being arranged to face an end surface of the circumferential edge of the window pane when the molding is attached to the window pane, and
      a foot portion protruding from a tip of the leg portion toward a center of the window pane and being arranged at a back surface side of the circumferential edge of the window pane when the molding is attached to the window pane,
   wherein at least a portion of the main body in a longitudinal direction thereof has a substantially U-shaped cross-sectional shape formed by the head portion, the leg portion, and the foot portion,
   wherein a volume raising portion is provided integrally with the head portion on the back surface of the head portion, the volume raising portion being provided to at least a portion of the head portion in the longitudinal direction,
   wherein a thickness of the volume raising portion varies at at least some positions in the longitudinal direction, and
   wherein the volume raising portion is made of a resin material softer than a resin material constituting the head portion.

2. The molding for a vehicle according to claim 1,
   wherein the leg portion of the main body includes,
      a main portion made of the same resin material as the resin material constituting the head portion, and
      a plurality of filled portions that are provided in the main portion and are intermittently arranged in the longitudinal direction of the main body, and
   wherein each filled portion of the leg portion is made of the same resin material as the resin material constituting the volume raising portion.

3. The molding for a vehicle according to claim 1,
   wherein a plurality of cushion projections are intermittently arranged in the longitudinal direction of the main body on an inner circumferential lateral surface of the leg portion that faces the end surface of the circumferential edge of the window pane, and
   wherein the plurality of cushion projections are made of the same resin material as the resin material constituting the volume raising portion.

4. The molding for a vehicle according to claim 1,
   wherein a portion of the foot portion, which abuts on the window pane or a vehicle body panel when the molding is attached to the window pane, is formed with a cushion abutting portion, which is made of a resin material softer than a resin material constituting the foot portion other than the cushion abutting portion.

5. A method for manufacturing the molding for a vehicle according to claim 1, the method comprising:
   performing primary molding by injection-molding a primary molded product including at least the head portion of the main body of the molding; and
   performing secondary molding by arranging the primary molded product as an insert in a forming mold and injection-molding the volume raising portion to the primary molded product by using the resin material softer than the resin material constituting the head portion.

* * * * *